April 8, 1930.  S. LOEB  1,753,897
HEATER FOR AUTOMOBILES
Filed Nov. 15, 1927
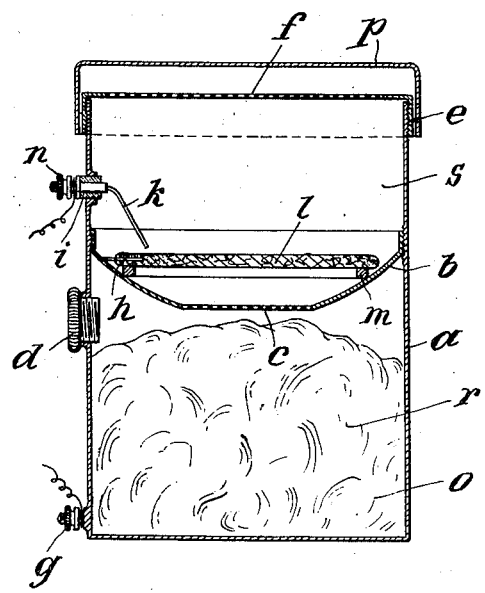
Inventor:
Siegmund Loeb Patented Apr. 8, 1930

1,753,897

UNITED STATES PATENT OFFICE

SIEGMUND LOEB, OF BERLIN-CHARLOTTENBURG, GERMANY

HEATER FOR AUTOMOBILES

Application filed November 15, 1927, Serial No. 233,455, and in Germany November 16, 1926.

This invention relates to improvements in heating devices for the water cooling system of automobile engines.

The object of the invention is to provide a heating unit for flameless combustion of a mixture of an evaporated liquid fuel and air, which is absolutely safe and may be easily started by the driver of the car.

A preferred embodiment of my invention is illustrated in the annexed drawing. The heater consists of a container $a$, which is divided into fuel chamber $r$ and combustion chamber $s$ by a plate $b$, having a screened opening $c$ in the bottom, in order to connect the combustion chamber $s$ with the fuel chamber $r$, containing liquid fuel such as gasoline preferably absorbed by cotton $o$ or the like. The fuel chamber $r$ has a filling opening closed by a screw stopper $d$.

The plate $b$ carries in the combustion chamber $s$ the contact substance $l$ such as platinized asbestos lying upon a ring $m$. The combustion chamber $s$ is closed by a cap $e$ provided with a screen $f$. This screen $f$ may be closed by a second cap $p$.

Mounted in the wall of the container $a$ is an insulating member $i$ through which extends into the combustion chamber $s$ an electrode $k$ provided with a binding post $n$ for connecting the electrode $k$ with one pole of a source of electric current preferably the source of the electrical ignition system of the engine not shown in the drawing. Another electrode $h$ extending into the contact substance $l$ is fastened to the plate $b$, which is in electrically conducting connection with the wall of the container $a$ carrying a binding post $g$ for connecting the electrode $h$ to the other pole of the source of current. One of the wires for connecting the two binding posts with the source of current preferably passes the dashboard of the car and is provided with a switch.

The device works as follows: The cap $p$ is removed from the container $a$ and the switch at the dashboard not shown in the drawing is closed for a moment. The spark produced between the electrodes $h$ and $k$ is sufficient to produce an explosion of the air-fuel vapor mixture always present in the combustion chamber $s$. This explosion produces enough heat to heat the contact substance $l$ to such a degree, that a continuous flameless combustion takes place in the combustion chamber $s$, as by the heat generated always fresh fuel is evaporated in the fuel chamber $r$ and enters the combustion chamber $s$, into which air enters through the screen $f$.

When the heater is to be stopped, the cap $f$ is placed upon the container $a$ thereby shutting off the supply of air.

I claim:

In a device for heating the water cooling system of automobile engines, a container closed by a screened cap, a plate dividing the interior of said container into an upper combustion and a lower supply chamber for liquid fuel, a screen in said plate, a catalyst for flameless combustion of evaporated fuel in said combustion chamber, an insulating member in the wall of said combustion chamber, an electrode passing through said insulating member, another electrode carried by said plate and extending into said catalyst and a binding post carried by said container and in electrically conducting connection with said second electrode.

In testimony whereof I affix my signature.

SIEGMUND LOEB.